(12) United States Patent
Hong

(10) Patent No.: US 7,193,674 B2
(45) Date of Patent: Mar. 20, 2007

(54) LIQUID CRYSTAL DISPLAY DEVICE AND METHOD OF FABRICATING THE SAME

(75) Inventor: Hyung Ki Hong, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 151 days.

(21) Appl. No.: 10/743,093

(22) Filed: Dec. 23, 2003

(65) Prior Publication Data

US 2004/0135955 A1    Jul. 15, 2004

(30) Foreign Application Priority Data

Dec. 31, 2002    (KR) .................. 10-2002-0088000

(51) Int. Cl.
*G02F 1/1368*   (2006.01)
*G02F 1/1347*   (2006.01)
*G02F 1/139*    (2006.01)

(52) U.S. Cl. .................... 349/141; 349/78; 349/110; 349/115; 349/176; 349/172

(58) Field of Classification Search ........... 349/141, 349/172–176, 179, 115, 74, 76, 77, 110, 78, 349/81, 158
See application file for complete search history.

(56) References Cited

U.S. PATENT DOCUMENTS

| 6,111,625 | A  | * | 8/2000 | Ohta et al. ............... 349/141 |
| 6,392,725 | B1 | * | 5/2002 | Harada et al. ............ 349/74 |
| 6,697,129 | B1 | * | 2/2004 | Nishi et al. .............. 349/33 |
| 2003/0112400 | A1 | * | 6/2003 | Izumi et al. ............. 349/141 |

* cited by examiner

*Primary Examiner*—Dung T. Nguyen
*Assistant Examiner*—Tai Duong
(74) *Attorney, Agent, or Firm*—Morgan, Lewis & Bockius LLP

(57) ABSTRACT

A liquid crystal display device includes a lower substrate, an upper substrate facing the lower substrate, a common electrode and a plurality of data electrodes on the lower substrate to generate an In-Plane switching mode electric field parallel to the lower and upper substrates, and a liquid crystal layer having a helical alignment between the lower and upper substrates.

28 Claims, 9 Drawing Sheets

LIQUID CRYSTAL DISPLAY DEVICE AND METHOD OF FABRICATING THE SAME

The present invention claims the benefit of Korean Patent Application No. P2002-88000 filed in Korea on Dec. 31, 2002, which is hereby incorporated by reference.

BACKGROUND OF THE INVENTION

1. Field of the Invention

The present invention relates to a display device and a method of fabricating a display device, and more particularly, to a liquid crystal display device and a method of fabricating a liquid crystal display device.

2. Discussion of the Related Art

In general, thin film transistor (TFT) liquid crystal display (LCD) devices are commonly used because of their superior resolution and thin profile. The TFT-LCD device includes a lower substrate having a TFT array substrate, an upper substrate having a color filter array substrate, a liquid crystal layer between the lower and upper substrates, and a backlight device provided below the lower substrate for emitting light through the device. Commonly, an amount of the light emitted from the backlight device and transmitted through the TFT and color filter array substrates is about 7%. Accordingly, it is necessary to improve luminous efficiency of the backlight device in order to obtain a high luminance LCD device. However, improving the luminous efficiency requires an increase in power consumption. For example, in portable LCD devices, such as a notebook computer, since large-capacity batteries are commonly used to provide the power required to drive the backlight device, overall weight of the portable LCD devices is relatively larger and time of use of the LCD devices is relatively short. In order to overcome these problems, a reflective-type LCD device, which does not require the use of the light emitted from the backlight device, has been developed.

The reflective-type LCD devices operate using ambient light, thereby significantly decreasing power consumption of the LCD devices. Accordingly, the reflective-type LCD devices are useful for portable display devices, such as electronic notebook or personal digital assistant (PDA) devices. The reflective-type LCD devices have opaque reflective plates or opaque reflective electrodes that correspond to pixel regions of transparent electrodes. However, the reflective-type LCD devices have low luminance since they use the ambient light. For example, in the reflective-type LCD devices, the ambient light is transmitted through the color filter substrate, and then the transmitted light is reflected by the reflective electrode of the lower substrate. Subsequently, the reflected light is transmitted back through the color filter substrate, thereby displaying an image. Accordingly, since the ambient light is transmitted through the color filter substrate twice, the light transmittance is lowered, thereby lowering luminance.

Generally, a thickness of the color filter is inversely proportional to light transmittance, and is proportional to color purity. Thus, decreasing the thickness of the color filter improves the light transmittance, but lowers the color purity. Since the color filter is formed of a resin, it is difficult to manufacture the color filter of a predetermined thickness. To overcome these problems, an LCD device that uses a cholesteric liquid crystal (CLC) layer is being developed that selectively reflects or transmits the ambient light.

Since a state of liquid crystal molecules is dependent upon their structure and composition, a liquid state is affected by temperature and density. For example, since nematic liquid crystal molecules having a regular arrangement along a predetermined direction, they are commonly used in LCD devices. Since, liquid crystal molecules of a CLC layer having chiral characteristics, wherein axes are twisted, a mixture with nematic liquid crystal molecules would result in directors of the nematic liquid crystal molecules becoming twisted. In general, the nematic liquid crystal molecules are regularly aligned along one direction, whereas the CLC layer has layered-structures such that the liquid crystal molecules of each layer have general nematic regularity. However, the liquid crystal molecules rotate about one direction between each of the layers, so that a reflexbility difference between the layers is generated. According to. the reflexibility difference, it is possible to display colors by light reflection and interference.

The liquid crystal molecules of the CLC layer are rotated in a helical structure, wherein the helical structure has two structural characteristics, such as rotation direction of helix and repetition period of helix, i.e., pitch. The pitch is a distance between points having the same alignment structure of the liquid crystal layer and is a variable for determining the color of the CLC layer. For example, a peak wavelength is a function of a product of the pitch and the average refractive index, $\lambda=n(avg)\cdot pitch$, wherein $n(avg)$ is the average refractive index of the liquid crystal. For example, when the pitch of the CLC having a average refractive index of 1.5 is 430 nm, the peak refractive wavelength is about 650 nm, thereby displaying a red color. Thus, by changing the pitch of the CLC, it is possible to obtain green and blue colors.

The rotation direction of the CLC helix is a characteristic of the CLC structure, which is an important factor in polarization of CLC reflectivity. That is, the circular polarizing direction of light is determined in accordance with the left or right polarization of the helical structure of the CLC. Accordingly, since the ambient light may be the mixture of left-circular polarized light and right-circular polarized light, it is possible to divide the left- or right-circular polarized light from the ambient light using the CLC. Thus, the CLC has greater light efficiency than that of the LCD device that makes use of linearly polarized light characteristics. Although the same power consumption is used, the CLC obtains great light transmittance as compared with that of the LCD device having color filters made of pigment or dye.

FIG. 1A and FIG. 1B are schematic cross sectional views of a reflective-type LCD device according to the related art. In FIGS. 1A and 1B, an upper transparent electrode 3 is formed on an upper transparent substrate 1, and receives a voltage from an external power source 17, wherein the upper transparent electrode 3 is formed of a transparent conductive metal, such as an Indium-Tin-Oxide ITO. Then, a first alignment layer 5 is formed on the upper transparent electrode 3 for an alignment of a liquid crystal layer, and a light-absorbing layer 11 is formed on a lower transparent substrate 9 for absorbing incident light. In addition, a lower transparent electrode 13 is formed on the light-absorbing layer 11 for applying a voltage to the liquid crystal layer, and a second alignment layer 15 is formed on the lower transparent electrode 13 for an alignment of the liquid crystal layer. Next, a CLC layer 7 is formed between the upper and lower transparent substrates 1 and 9 facing each other.

The CLC layer 7 selectively reflects circular polarized light having a predetermined wavelength to produce specific colors according to their wavelength. In addition, the CLC layer 7 functions as a reflective plate, thereby making it possible to omit an additional color filter and a reflective plate.

The CLC layer 7 may be used to control an ON/OFF mode of the power source 17. First, during an OFF mode of the power source 17, as shown in FIG. 1A, the liquid crystal molecules of the CLC layer 7 have a helical pitch (not shown), wherein a helical axis is formed along a vertical direction. Accordingly, when light is incident on the CLC layer 7, left-circular polarized light 23 having the same wavelength as the helical pitch (twisted extent of the liquid crystal layer) is completely reflected, and right-circular polarized light 21 is dispersed and transmitted through the CLC layer 7 to be absorbed by the light-absorbing layer 11. Meanwhile, if the liquid crystal molecules are twisted along an opposite direction, the right-circular polarized light 21 is completely reflected, and the left-circular polarized light 23 is completely absorbed.

Accordingly, a user observes the left-circular polarized light 23 or the right-circular polarized light 21 reflected by the CLC layer 7 as a white state. In addition, the light having the predetermined wavelength (i.e., the same wavelength as that of the helical pitch of the CLC) is reflected, so that the user observes light having a specific color according to the predetermined wavelength.

During the ON mode of the power source 17, as shown in FIG. 1B, the liquid crystal molecules of the CLC layer 7 are aligned along an electric field oriented in-plane to the upper and lower substrates 1 and 9, wherein the electric field is induced along the vertical direction between the upper and lower transparent electrodes 3 and 13. Accordingly, the helical axis of the CLC layer 7 is not formed so that the most of the left-circular polarized incident light 19a and the right-circular polarized incident light 19b is dispersed and transmitted through the CLC layer 7 to be absorbed by the light-absorbing layer 11. Thus, the user does not observe the reflected light, (i.e., a dark state).

When the external voltage is not applied from the power source 17, it is possible to selectively reflect the left-circular polarized light 23 (in FIG. 1A) or the right-circular polarized light 21 having the same wavelength as that of the helical pitch to the direction of the helical axis for being in-plane to the upper and lower substrates 1 and 9. Upon application of the external voltage from the power source 17, the helical axis disappears due to the vertical electric field, whereby the incident light 19 is absorbed by the light-absorbing layer 11, thereby displaying a black image (i.e., black state). Thus, a single color is generated by reflecting the light having the predetermined wavelength with a single CLC layer 7.

FIG. 2 is a cross sectional view of another LCD device according to the related art. In FIG. 2, an LCD device includes a first LCD panel 1, a second LCD panel 2, and a third LCD panel 3. The first LCD panel 1 forms a first CLC layer 7a having a helical pitch the same as a wavelength of light corresponding to a red color, the second LCD panel 2 forms a second CLC layer 7b having a helical pitch the same as a wavelength of light corresponding to a green color, and the third LCD panel 3 forms a third CLC layer 7c having a helical pitch the same as a wavelength of light corresponding to a blue color.

When the light 19 is incident, the first, second, and third CLC layers 7a, 7b and 7c are twisted along a left-handed screw direction to reflect left-circular polarized light of a red color wavelength 25, a green color wavelength 27, and a blue color wavelength 29, respectively, thereby producing light having various colors. In addition, right-circular polarized light is dispersed and transmitted through the first, second, and third CLC layers 7a, 7b and 7c, and is absorbed by a light-absorbing layer 11 formed on a lower transparent substrate 9c. Accordingly, the first, second, and third CLC layers 7a, 7b and 7c are formed for reflecting the light corresponding to the red, green, and blue color wavelengths to produce light having various colors. However, the LCD device requires an increased number of substrates, thereby lowering contrast ratio and efficiency.

SUMMARY OF THE INVENTION

Accordingly, the present invention is directed to a liquid crystal display device and method of fabricating a liquid crystal display device that substantially obviates one or more problems due to limitations and disadvantages of the related art.

An object of the present invention is to provide a liquid crystal display device having a liquid crystal layer of a helical alignment for improving contrast ratio and light efficiency.

Another object of the present invention is to provide a method of fabricating a liquid crystal display device having a liquid crystal layer of a helical alignment for improving contrast ratio and light efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these objects and other advantages and in accordance with the purpose of the invention, as embodied and broadly described, a liquid crystal display device includes a lower substrate, an upper substrate facing the lower substrate, a common electrode and a plurality of data electrodes on the lower substrate to generate an In-Plane switching mode electric field parallel to the lower and upper substrates, and a liquid crystal layer having a helical alignment between the lower and upper substrates.

In another aspect, a liquid crystal display device includes a lower substrate, an upper substrate disposed opposite to the lower substrate, a light-absorbing layer on the lower substrate, a gate line, a gate electrode, a common line, and a common electrode on the lower substrate, a gate insulating layer along an entire surface of the lower substrate, a thin film transistor including a semiconductor layer on the gate insulating layer above the gate electrode, source and drain electrodes above both sides of the semiconductor layer, and the gate electrode, a data line and a data electrode on the gate insulating layer perpendicular to the gate line, a passivation layer on the lower substrate including the data electrode, a first alignment layer on the passivation layer, a black matrix layer on the upper substrate to prevent light leakage on the data line, the gate line, and the thin film transistor, a second alignment layer on the upper substrate including the black matrix layer, and a liquid crystal layer having a helical alignment between the upper and lower substrates.

In another aspect, a liquid crystal display device includes a light-absorbing layer on a first substrate, a first common electrode and a first data electrode on the first substrate, a first liquid crystal layer having a helical alignment to reflect circularly polarized light at one direction according to an In-Plane switching mode electric field induced by the first common electrode and the first data electrode, a second substrate on the first liquid crystal layer, a second liquid crystal layer having a helical alignment on the second substrate to reflect circularly polarized light at a direction different from that in the first liquid crystal layer, a third substrate on the second liquid crystal layer, and a second common electrode and a second data electrode on one of the second and third substrates to control the second liquid crystal layer.

In another aspect, a method of fabricating a liquid crystal display device includes forming a common electrode and a plurality of data electrodes on a lower substrate to generate an In-Plane switching mode electric field parallel to the lower substrate, and forming a liquid crystal layer having a helical alignment between the lower substrate and an upper substrate.

In another aspect, a method of fabricating a liquid crystal display device includes forming a light-absorbing layer on a lower substrate, forming a gate line, a gate electrode, a common line, and a common electrode on the lower substrate, forming a gate insulating layer along an entire surface of the lower substrate, forming a thin film transistor on the lower substrate including a semiconductor layer on the gate insulating layer above the gate electrode, source and drain electrodes above both sides of the semiconductor layer, and the gate electrode, forming a data line and a data electrode on the gate insulating layer perpendicular to the gate line, forming a passivation layer on the lower substrate including the data electrode, forming a first alignment layer on the passivation layer, forming a black matrix layer on an upper substrate to prevent light leakage on the data line, the gate line, and the thin film transistor, forming a second alignment layer on the upper substrate including the black matrix layer, and forming a liquid crystal layer having a helical alignment between the upper and lower substrates.

In another aspect, a method of fabricating a liquid crystal display device includes forming a light-absorbing layer on a first substrate, forming a first common electrode and a first data electrode on the first substrate, forming a first liquid crystal layer having a helical alignment to reflect circularly polarized light at one direction according to an In-Plane switching mode electric field induced by the first common electrode and the first data electrode, providing a second substrate on the first liquid crystal layer, forming a second liquid crystal layer having a helical alignment on the second substrate to reflect circularly polarized light at a direction different from that in the first liquid crystal layer, providing a third substrate on the second liquid crystal layer, and forming a second common electrode and a second data electrode on one of the second and third substrates to control the second liquid crystal layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1A:
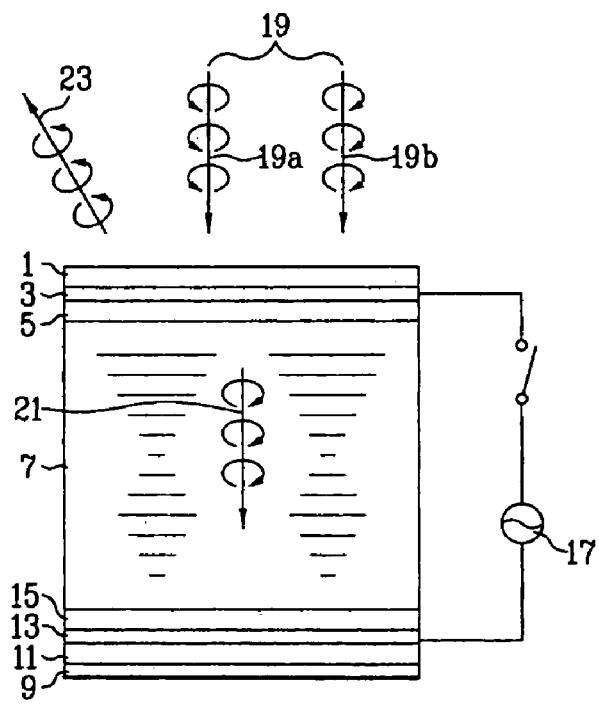
FIG. 1A and FIG. 1B are schematic cross sectional views of a reflective-type LCD device according to the related art.
Figure 1B:
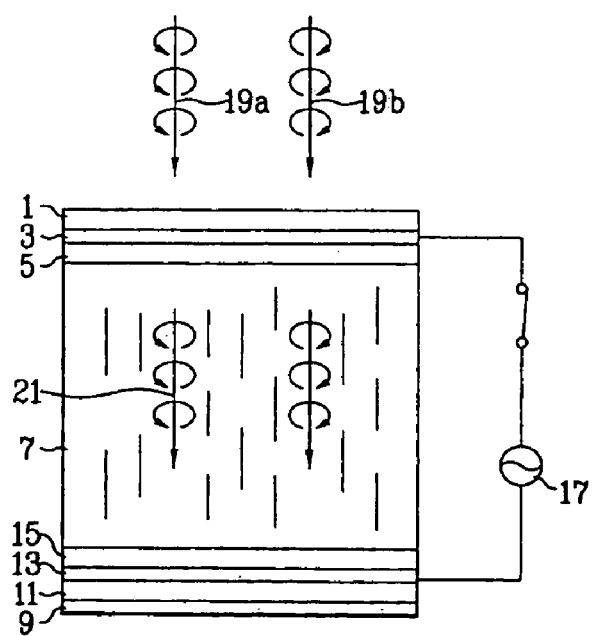
Figure 2:
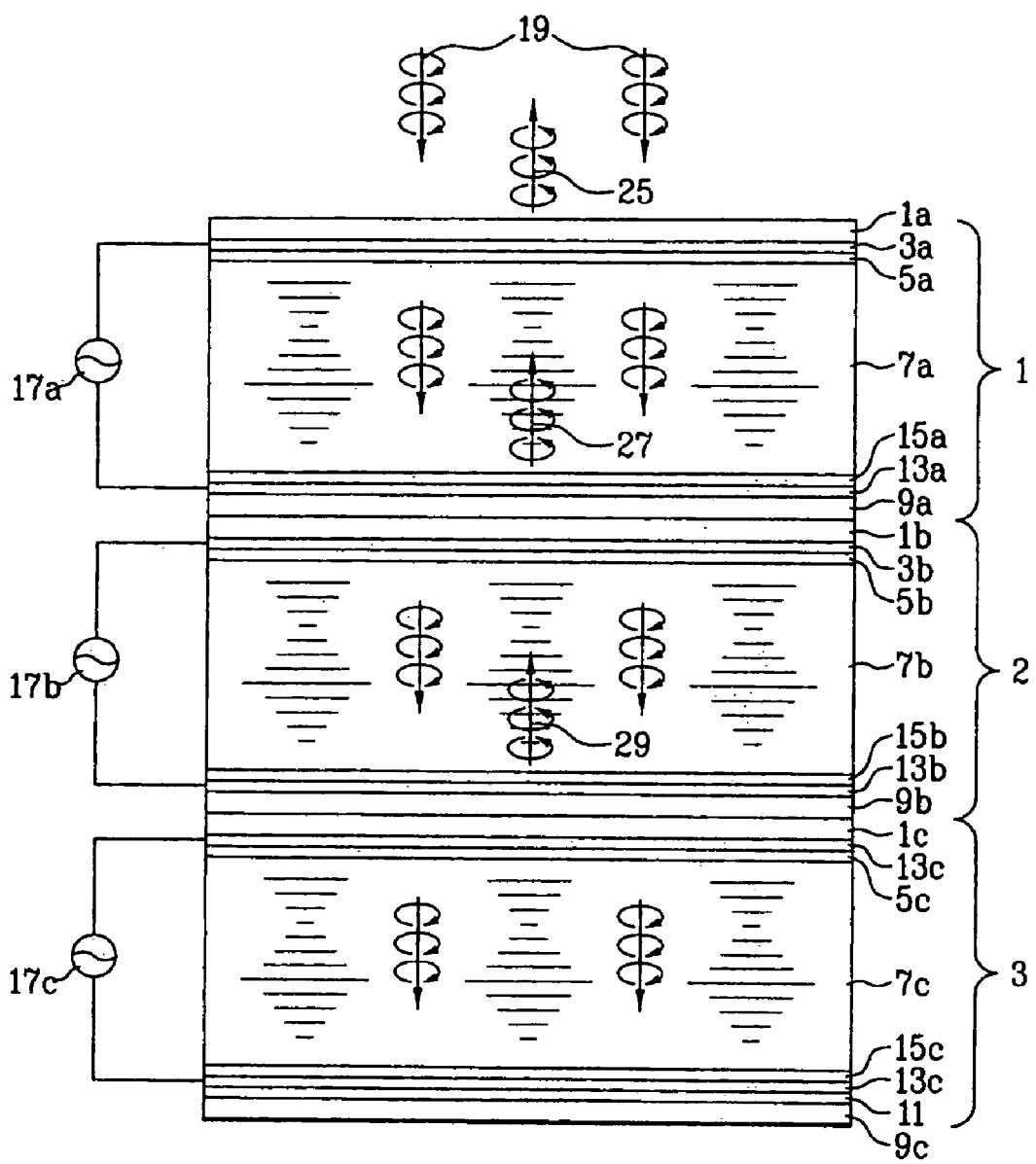
FIG. 2 is a cross sectional view of another LCD device according to the related art.
Figure 3:
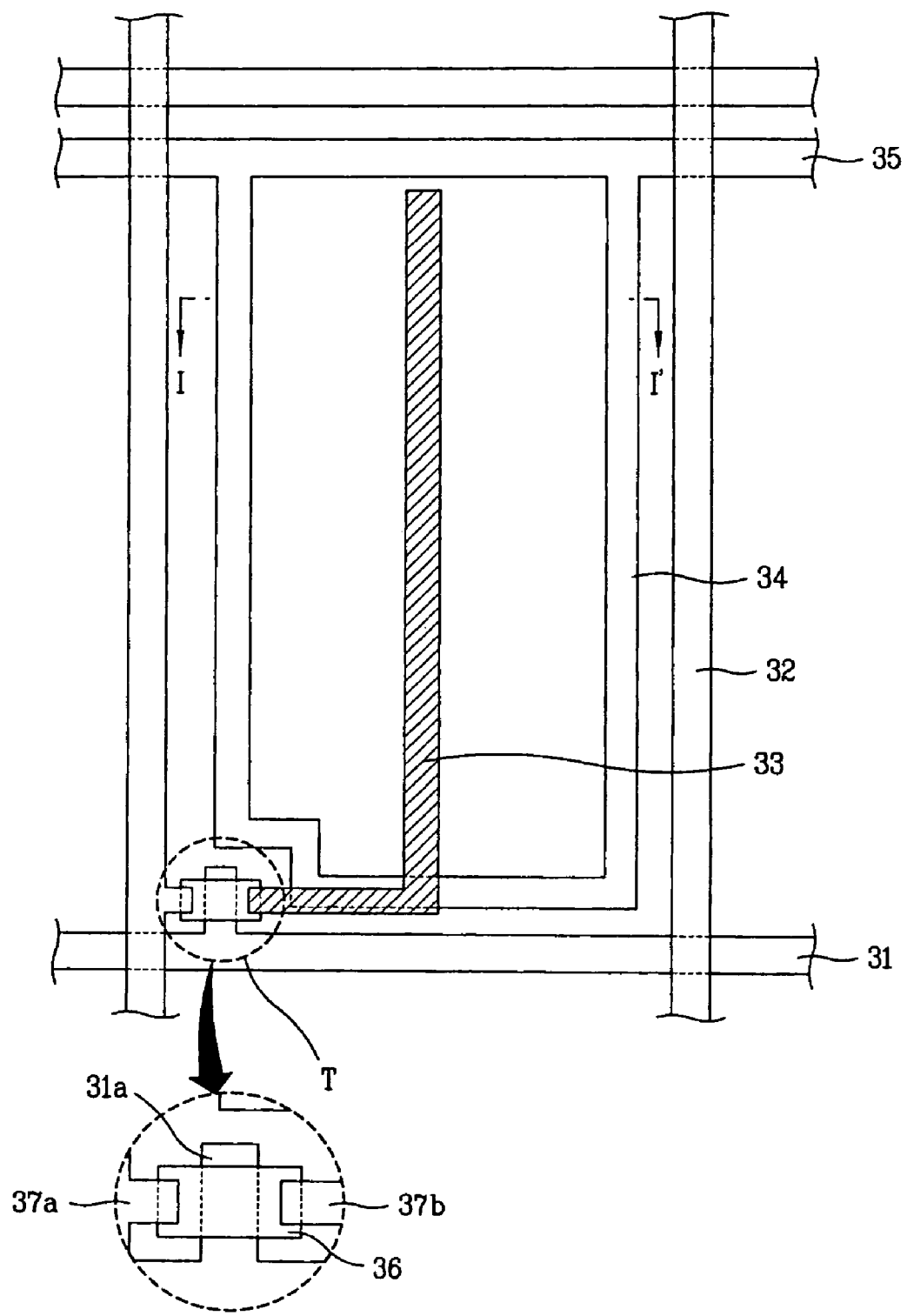
FIG. 3 is a plan view of an exemplary LCD device according to the present invention.
Figure 4:
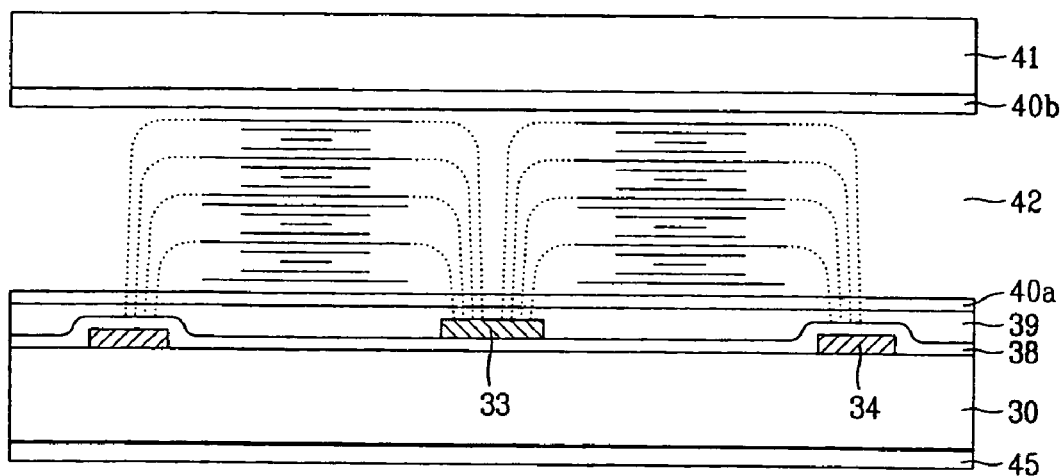
FIG. 4 is a cross sectional view along I–I' of FIG. 3 according to the present invention.

FIG. 3 is a plan view of an exemplary LCD device according to the present invention, and FIG. 4 is a cross sectional view along I–I' of FIG. 3 according to the present invention. In FIG. 3, an LCD may be an In-Plane Switching mode LCD device that includes a plurality of gate and data lines 31 and 32, a plurality of common lines 35, and a plurality of common electrodes 34, wherein the plurality of gate lines 31 may cross the plurality of data lines 32 for defining a plurality of pixel regions (not shown). Then, a plurality of common lines 35 may be formed in parallel with the plurality of gate lines 31, and the plurality of common electrodes 34 may be connected to the common lines 35 in parallel with the data lines 32.

In addition, a thin film transistor T may be formed at each crossing point of the gate and data lines 31 and 32. The thin film transistor T may include a gate electrode 31 a, a gate insulating layer (not shown), a semiconductor layer 36, and source/drain electrodes 37a and 37b. A data electrode 33 may be formed to be connected to the drain electrode 37b, and may partially overlap the common electrode 34. In the unit pixel region, the data electrode 33 and the common electrode 34 may be disposed in parallel with the data line 32, and the data electrode 33 may partially overlap the common line 35 and the common electrode 34, thereby forming a capacitor (not shown).

In FIG. 4, the LCD device may include a lower substrate 30 and an upper substrate 41 that face each other, wherein the lower substrate 30 may include a light-absorbing layer 45, the gate line 31, the gate electrode 31a (in FIG. 3), the common line 35 (in FIG. 3), the common electrode 34, the gate insulating layer 38, the semiconductor layer (36 of FIG. 3), the source and drain electrodes 37a and 37b (in FIG. 3), the data line 32 (in FIG. 3) and the data electrode 33, a passivation layer 39, and a first alignment layer 40a. In addition, the light-absorbing layer 45 may be formed along an outer surface of the lower substrate 30, and the gate line 31 (in FIG. 3), the gate electrode 31a (in FIG. 3), the common line 35 (in FIG. 3), and the common electrode 34 may be formed on the lower substrate 30. Next, the gate insulating layer 38 may be formed along an entire surface of the lower substrate 30 including the common electrode 34. Then, the semiconductor layer may be formed on the gate insulating layer 38 above the gate electrode 31a. In addition, the source and drain electrodes 37a and 37b (in FIG. 3) may be formed above both sides of the semiconductor layer 38, and the data line 32 (in FIG. 3) and the data electrode 33 may be formed on the gate insulating layer 38 to be perpendicular to the gate line 31. Then, the passivation layer 39 may be formed along an entire surface of the lower substrate 30 including the data electrode 33, and the first alignment layer 40a may be formed on the passivation layer 39.

In FIG. 4, the upper substrate 41 may include a black matrix layer (not shown) and a second alignment layer 40b, wherein the black matrix layer (not shown) may be formed for preventing light from leaking into portions corresponding to the data line 32, the gate line 31, and the thin film transistor T (in FIG. 3). In addition, the second alignment layer 40b may be formed on the upper substrate 41 including the black matrix layer. Then, a liquid crystal layer 42 of a helical alignment may be formed between the lower and upper substrates 30 and 41.

If the lower and upper substrates 30 and 41 are formed of a transparent material, the light-absorbing layer 45 may be formed between the lower substrate 30 and the common electrode 34. Alternatively, if the lower substrate 30 is formed of an opaque material, the light-absorbing layer 45 may not be necessary according to operational characteristics of the LCD device. Moreover, the liquid crystal layer 42 may be formed of a CLC or a ferroelectric liquid crystal (FLC) layer. Accordingly, when applying a voltage from an external power source to the common electrode 34 and the data electrode 33 on the lower substrate 30, an electric field may be generated in parallel with the upper and lower substrates 30 and 41. Thus, a helical pitch of the liquid crystal layer may increase since liquid crystal molecules of the liquid crystal layer may be aligned according to the direction of the electric field.

When the helical direction of the liquid crystal layer is at the right-handed screw direction and non-polarized light is incident on the liquid crystal layer, the right-circular polarized light, having a wavelength corresponding to the helical pitch, may be reflected. Thus, left-circular polarized light may be transmitted through the liquid crystal layer, and then absorbed by the light-absorbing layer 45, thereby displaying a black image. In addition, the LCD device may have a maximum luminosity of about 50%, since the left or right circular polarized light may be selectively produced from the non-polarized light.

When the helical direction of the liquid crystal layer is at the left-handed screw direction and non-polarized light is incident on the liquid crystal layer, the left-circular polarized light, having a wavelength corresponding to the helical pitch, may be reflected. The right-circular polarized light is transmitted through the liquid crystal layer, and then absorbed by the light-absorbing layer 45, thereby displaying a black image.

Figure 5A:
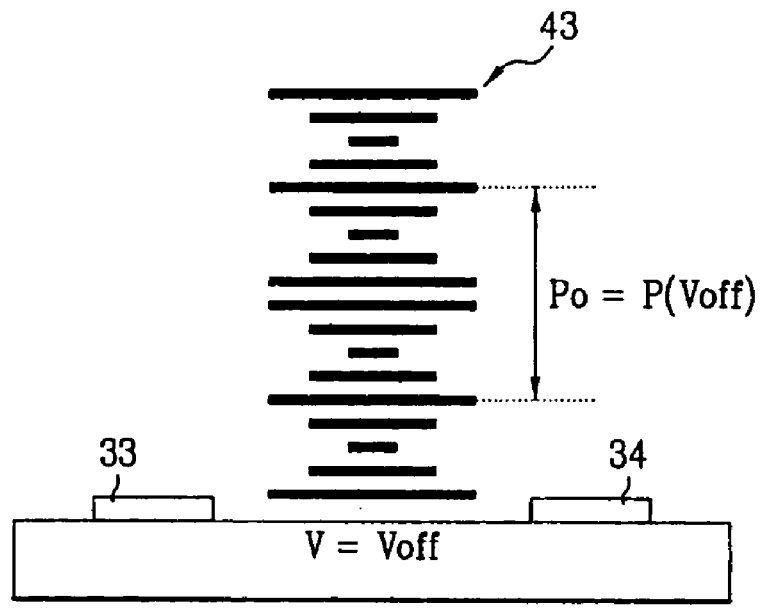
FIG. 5A and FIG. 5B are cross sectional views demonstrating CLC characteristics according to the present invention.
Figure 5B:
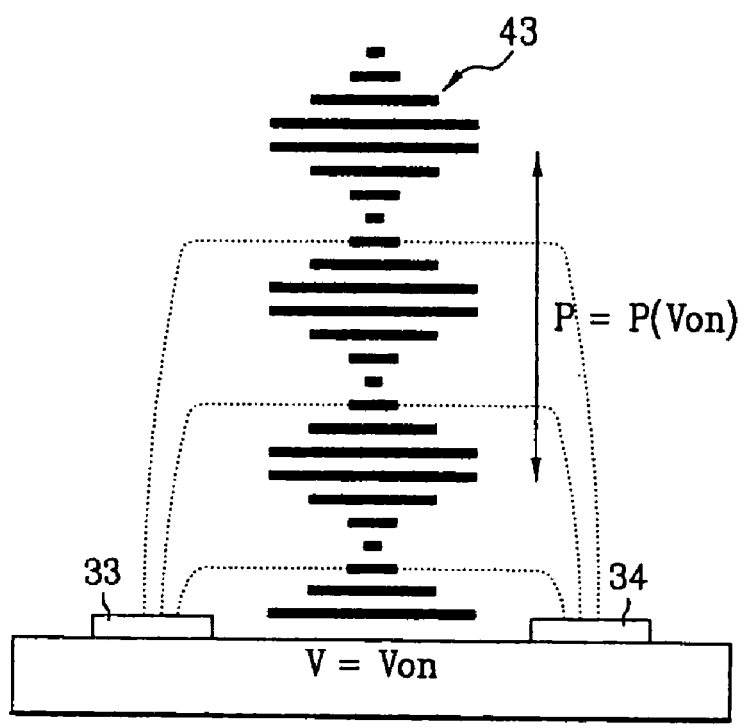

FIG. 5A and FIG. 5B are cross sectional views demonstrating CLC characteristics according to the present invention. In FIG. 5A, when an electric field is not applied (V=Voff) between a common electrode 34 and a data electrode 33, liquid crystal 43 may have a minimum helical pitch $P_0$. In FIG. 5B, when an electric field is applied (V=Von) between the common electrode 34 and the data electrode 33, a helical pitch P may be proportional to an intensity of the electric field. A helical axis of the liquid crystal 43 may be fixed along a vertical direction, thereby obtaining the helical pitch P along the vertical direction. Accordingly, a smallest value of the helical pitch P may result from the electric field not being generated from the external power source (V=Voff). Thus, it may be possible to select a wavelength of circular polarized light by electrically controlling the helical pitch according to the applied voltage.

The wavelength of the circular polarized light may be variable according to the intensity of the helical pitch P so that it may be possible to reflect light having various wavelengths using a single liquid crystal layer 43. In addition, a rubbing process for the first/second alignment layers 40a and 40b may not be necessary.

According to the present invention, it may be possible to select a wavelength of circular polarized light that may be reflected by controlling a helical pitch P of liquid crystal 43 according to an electric field formed in parallel with upper and lower substrates 41 and 30 using an In-Plane switching-mode electrode structure. Thus, if a voltage is applied to two electrodes of the lower substrate 30, a reflected color may be displayed that may transition from blue to black (i.e., blue→green→red→black). When the helical pitch P of the liquid crystal 43 is varied according to the intensity of the applied voltage, the reflected light may produce various colors, such as bluish green and yellow, as well as blue, green, and red.

Various methods, such as time division and area division, may be employed for displaying gray colors. For example, it may be possible to display light colors of red, orange, yellow, green, blue, deep blue, and violet, as well as black color in one pixel region using the area division method. In addition, when using three pixel regions, it may be possible to obtain 512 different colors (i.e., $8^3$). Accordingly, the LCD device may use the liquid crystal 43 of the helical pitch P being proportional to the intensity of the electric field induced by the In-Plane switching mode electrode to produce various colors having wavelengths similar to the helical pitch P. Moreover, the LCD device may have a light efficiency of about 50%, since the left- or right-circular polarized light may be selectively realized from the non-polarized light.

FIGS. 6 to 9 are cross sectional views of another exemplary LCD device according to the present invention. In FIGS. 6 to 9, an LCD device may include a first substrate 30a, a light-absorbing layer 45, a first common electrode 34a, a first data electrode 33a, a first liquid crystal layer 43a, a second substrate 30b, a second liquid crystal layer 43b, a third substrate 30c, a second common electrode 34b, and a second data electrode 33b. The light-absorbing layer 45 may be formed along an outer surface of the first substrate 30a, and the first common electrode 34a and the first data electrode 33a may be formed on the first substrate 30a. In addition, the first substrate 30a may include a first gate insulating layer 38a and a first passivation layer 39a. Accordingly, the first liquid crystal layer 43a may reflect the circular-polarized light at one direction according to an In-Plane switching mode electric field induced by the first common electrode 34a and the first data electrode 33a. The second substrate 30b may be formed on the first liquid crystal layer 43a and may include a second gate insulating layer 38b and a second passivation layer 39b, wherein the second liquid crystal 43b may be formed above the second substrate 30b to reflecting the light circularly polarized at a direction different from that in the first liquid crystal layer 43a. Then, the third substrate 30c may be formed above the second liquid crystal layer 43b, and the second common electrode 34b and the second data electrode 33b may be formed on one of the second and third substrates 30b and 30c for controlling the second liquid crystal layer 43b.

In FIGS. 6 to 9, if the first, second, and third substrates 30a, 30b, and 30c are formed of a transparent material, the light-absorbing layer 45 may be formed between the first substrate 30a and the first common electrode 34a. Alternatively, the first substrate 30a may be formed of an opaque material. In addition, the first and second liquid crystal layers 43a and 43b may divide non-polarized light into the left- and right-circular polarized light, and then the first and second liquid crystal layers 43a and 43b may reflect the left- and right-circular polarized light, respectively.

When applying a voltage to correspond to the helical pitches P of the first and second liquid crystal layers 43a and 43b, the left- and right-circular polarized light of the non-polarized light corresponding to the helical pitch value P may be reflected by the first and second liquid crystal layers 43a and 43b, thereby realizing a maximum reflexibility of about 100%. When the helical pitches P of the first and second liquid crystal layers 43a and 43b are different from each other, it may be possible to reflect the left-circular polarized light and the right-circular polarized light of the non-polarized light having the wavelength corresponding to each helical pitch P.

In FIGS. 6 to 9, first and second alignment layers 40a and 40b may be formed on opposing surfaces of the first and second substrates 30a and 30b, respectively, for alignment of the first liquid crystal layer 43a. In addition, third and fourth alignment layers 40c and 40d may be formed on opposing surfaces of the second and third substrates 30b and 30c, respectively, for alignment of the second liquid crystal layer 43b. Preferably, a rubbing process may not be performed and a weak anchoring energy of the first, second, third, and fourth alignment layers 40a, 40b, 40c, and 40d may be used to provide a horizontal alignment of rotating liquid crystal molecules at respective borders between the liquid crystal layer and the first, second, third, and fourth alignment layers 40a, 40b, 40c, and 40d.

Figure 6:
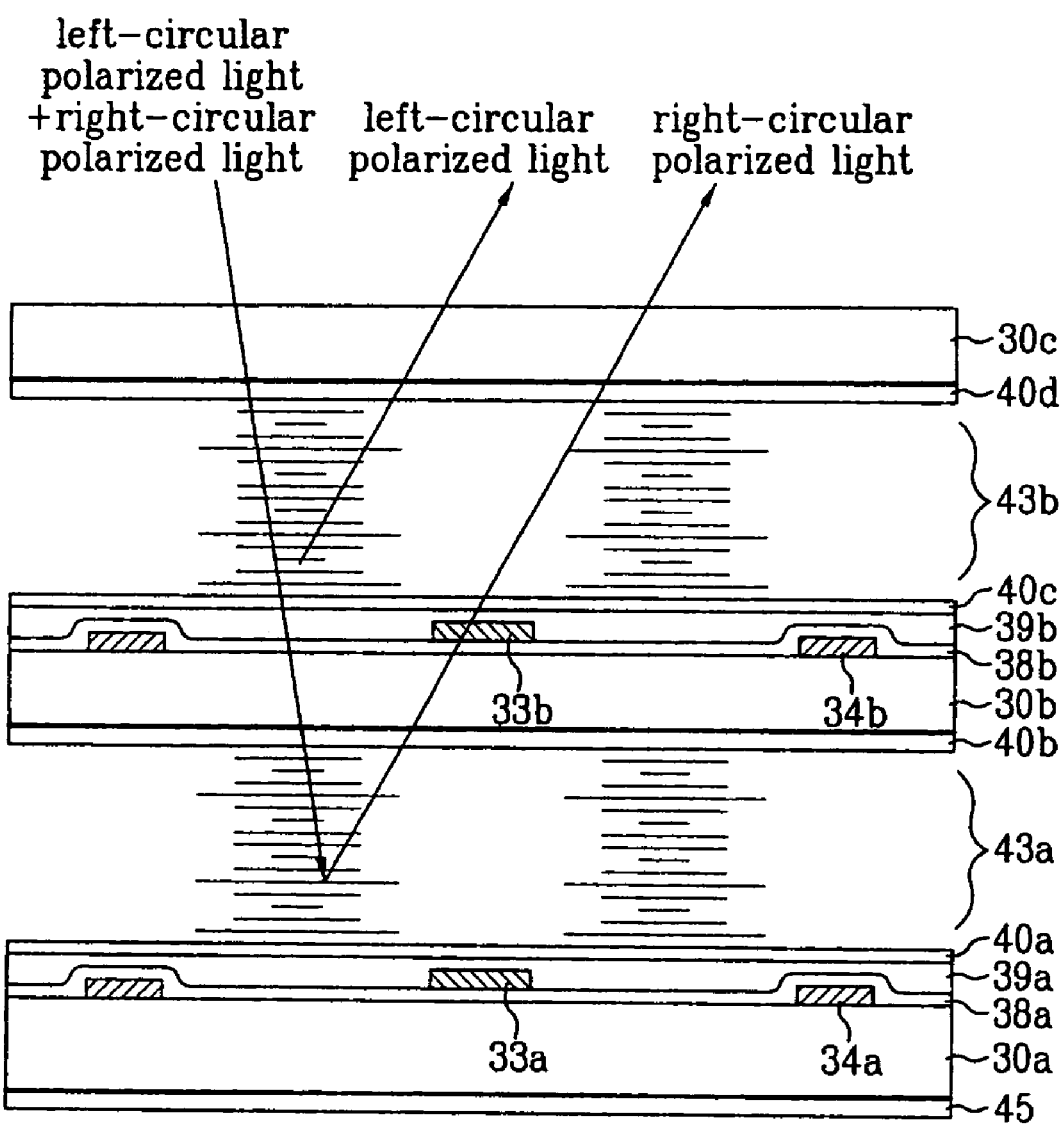
FIGS. 6 to 9 are cross sectional views of another exemplary LCD device according to the present invention.
Figure 7:
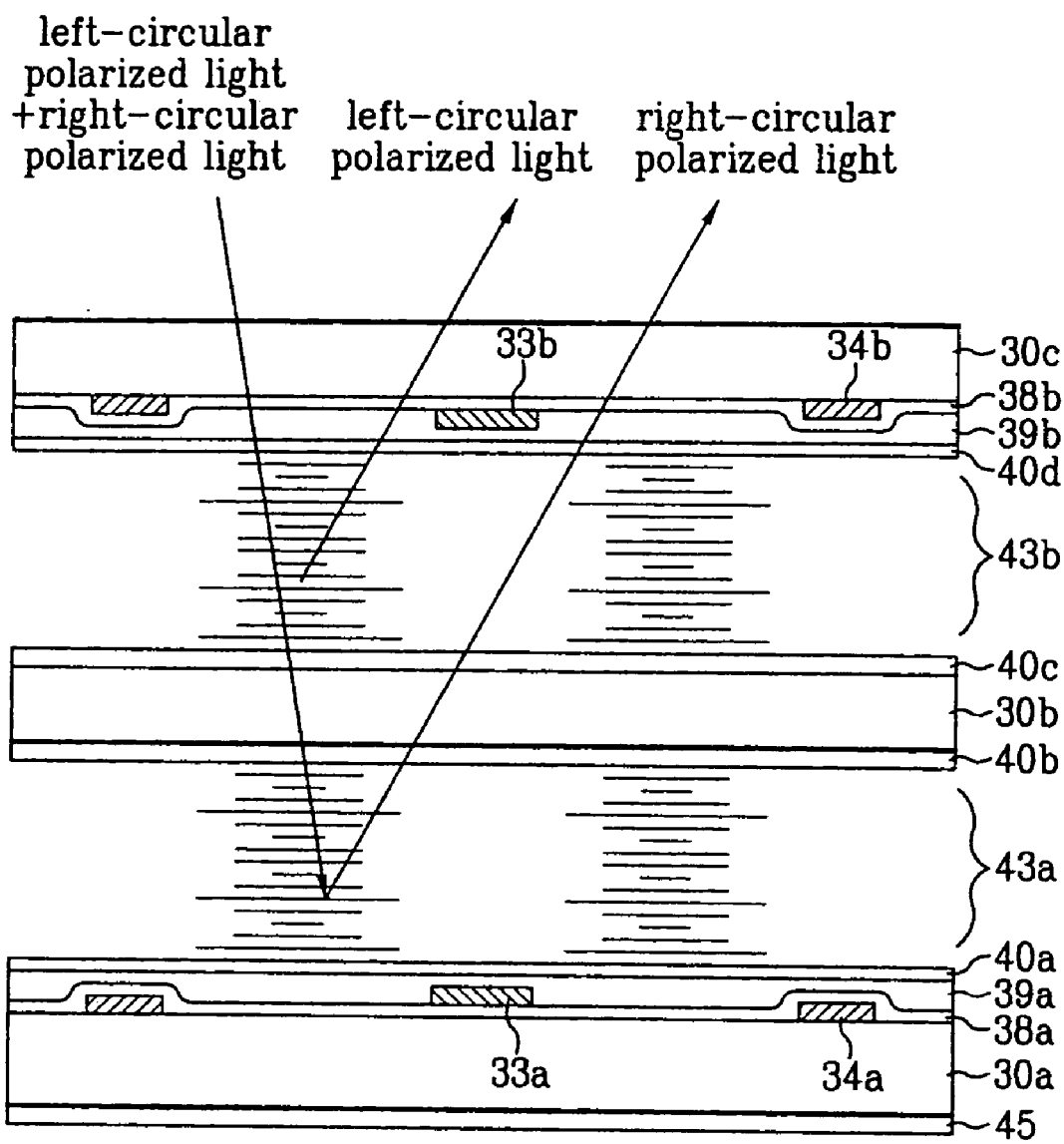

In FIGS. 6 and 7, it may be possible to decrease a distance between the first and second liquid crystal layers 43a and 43b for reflecting the light having the different circular polarizing directions in the second substrate 30b, thereby decreasing the time difference of the light reflected in the plurality of liquid crystal layers.

Figure 8:
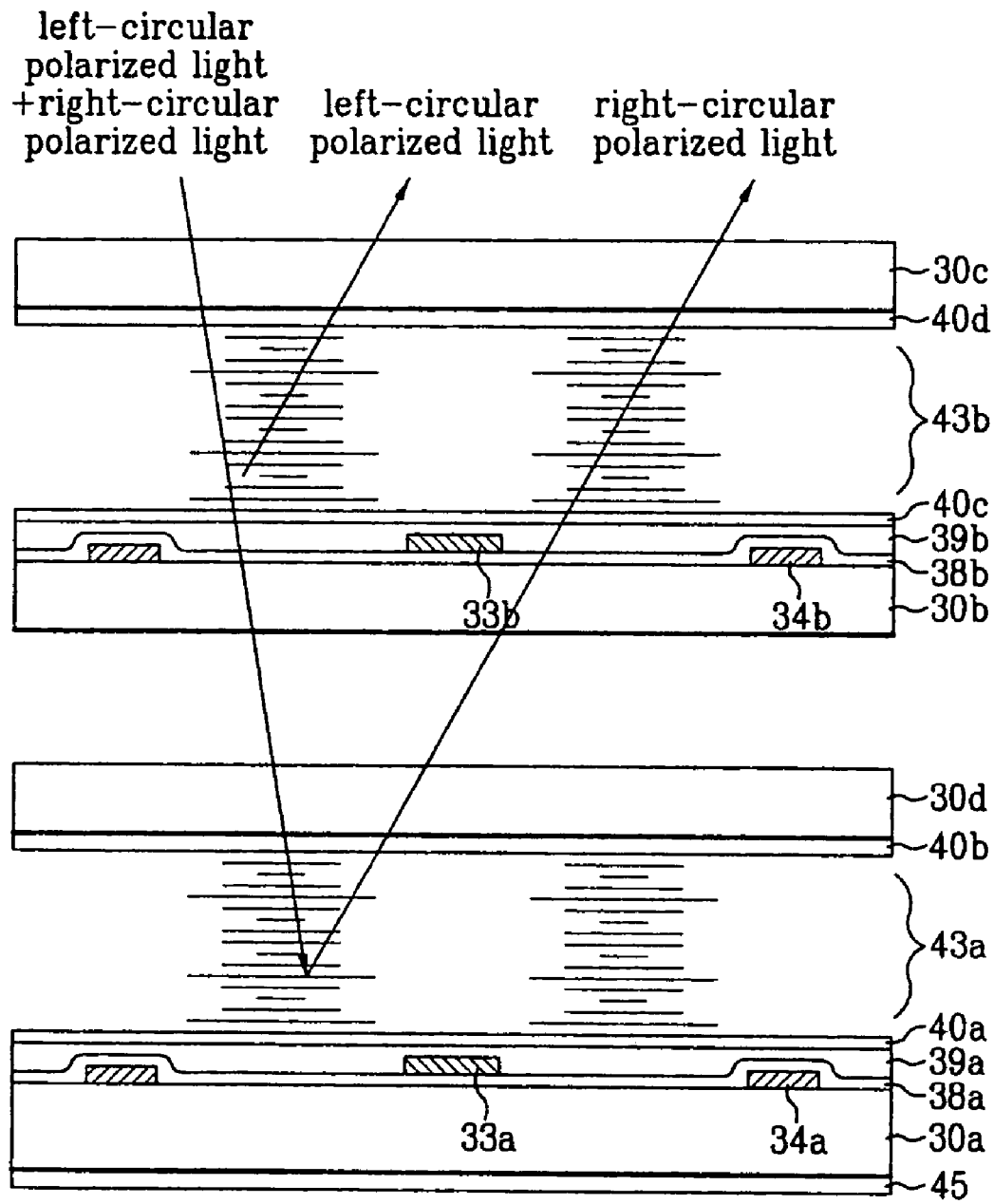
Figure 9:
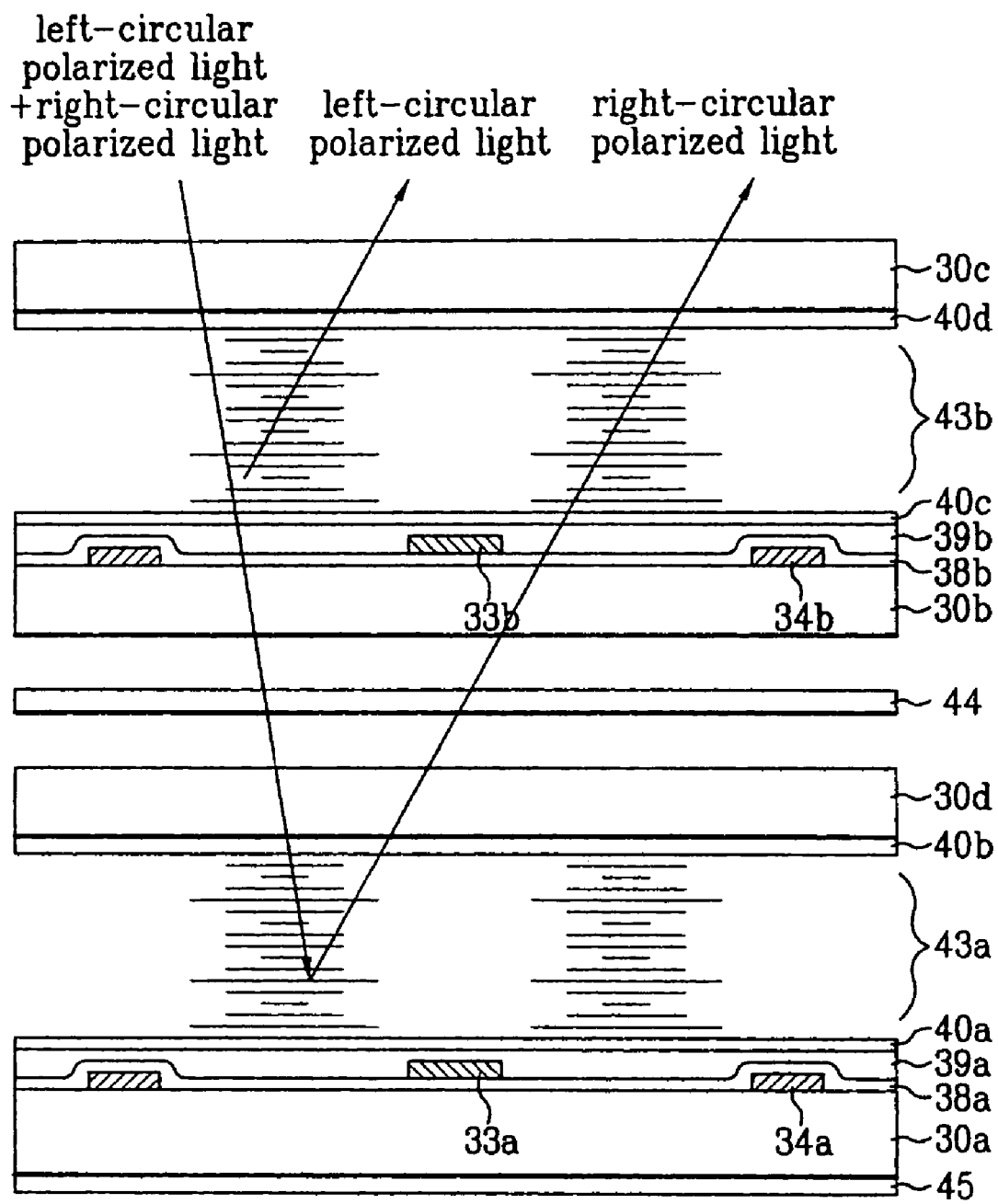

In FIG. 8, it may be possible to simplify fabrication process steps of the LCD device by using a fourth substrate 30d, wherein the plurality of liquid crystal layers 43a and 43b may have different directions for reflecting the circular polarized light. In addition, as shown in FIG. 9, a phase difference plate 44 may be provided between the plurality of LCD panels for selectively reflecting the polarized light.

Accordingly, the LCD device may obtain improved light efficiency by using the plurality of liquid crystal layers 43a and 43b for reflecting the circular polarized light having the different directions. In addition, the LCD device may display a single color at light efficiencies of about 0%, 50%, and 100%, thereby improving production of the gray colors. Moreover, the LCD device may display light having colors of red, orange, yellow, green, blue, deep blue, and violet colors, as well as black, with one liquid crystal layer according to the intensity of the applying voltage. Accordingly, when using the two liquid crystal layers, the LCD device may display 16 colors. For example, in the three pixel regions of an area division method, it may be possible to display 4096 (i.e., $16^3$) different colors. Alternatively, it may be possible to use a ferroelectric liquid crystal (FLC) layer having a predetermined pitch instead of using the liquid crystal according to the present invention.

It will be apparent to those skilled in the art that various modifications and variations can be made in the liquid crystal display device and method of fabricating a liquid crystal display device of the present invention. Thus, it is intended that the present invention covers the modifications and variations of this invention provided they come within the scope of the appended claims and their equivalents.

What is claimed is:

1. A liquid crystal display device, comprising:
 a light-absorbing layer on a first substrate;
 a first common electrode and a first data electrode on the first substrate;
 a first liquid crystal layer having a helical alignment to reflect circularly polarized light at one direction according to an In-Plane switching mode electric field induced by the first common electrode and the first data electrode;
 a second substrate on the first liquid crystal layer;
 a second liquid crystal layer having a helical alignment on the second substrate to reflect circularly polarized light at a direction different from that in the first liquid crystal layer;
 a third substrate on the second liquid crystal layer; and
 a second common electrode and a second data electrode on one of the second and third substrates to control the second liquid crystal layer.

2. The device according to claim 1, wherein the light-absorbing layer is formed between the lower substrate and the common electrode.

3. The device according to claim 1, further comprising first and second alignment layers formed on opposing surfaces of the first and second substrates, respectively.

4. The device according to claim 1, further comprising third and fourth alignment layers formed on opposing surfaces of the second and third substrates, respectively.

5. The device according to claim 1, further comprising a fourth substrate between the first liquid crystal layer and the second substrate.

6. The device according to claim 5, further comprising a phase difference plate between the fourth substrate and the second substrate.

7. The device according to claim 1, wherein the first and second liquid crystal layers include cholesteric liquid crystal layers.

8. The device according to claim 1, wherein the first and second liquid crystal layers include ferroelectric liquid crystal layers.

9. A liquid crystal display device, comprising:
 a lower substrate;
 an upper substrate disposed opposite to the lower substrate;
 a middle substrate disposed between the lower and upper substrate;
 a light-absorbing layer on the lower substrate;
 a gate line, a gate electrode, a common line, and a common electrode on the lower substrate;
 a gate insulating layer along an entire surface of the lower substrate;
 a thin film transistor including a semiconductor layer on the gate insulating layer above the gate electrode, source and drain electrodes above both sides of the semiconductor layer, and the gate electrode;
 a data line and a data electrode on the gate insulating layer perpendicular to the gate line;
 a passivation layer on the lower substrate including the data electrode;
 a first alignment layer on the passivation layer;
 a black matrix layer on the upper substrate to prevent light leakage on the data line, the gate line, and the thin film transistor;
 a second alignment layer on the upper substrate including the black matrix layer;
 a third alignment layer on a first side of the middle substrate facing the lower substrate;
 a fourth alignment layer on a second side of the middle substrate facing the upper substrate;
 a first liquid crystal layer having a first helical alignment between the upper and middle substrates; and
 a second liquid crystal layer having a second helical alignment different from the first helical alignment between the lower and middle substrates.

10. The device according to claim 9, wherein the upper, middle, and lower substrates are formed of a transparent material.

11. The device according to claim 9, wherein the light-absorbing layer is formed between the lower substrate and the common electrode.

12. The device according to claim 9, wherein a voltage applied to the common electrode and the data electrode is proportional to a helical pitch of at least one of the first and second liquid crystal layers.

13. The device according to claim 9, wherein the first and second alignment layers are not rubbed, or have weak anchoring energy.

14. The device according to claim 9, wherein a helical axis of at least one of the first and second liquid crystal layers is perpendicular to the upper and lower substrates.

15. A method of fabricating a liquid crystal display device, comprising:
forming a light-absorbing layer on a first substrate;
forming a first common electrode and a first data electrode on the first substrate;
forming a first liquid crystal layer having a helical alignment to reflect circularly polarized light at one direction according to an In-Plane switching mode electric field induced by the first common electrode and the first data electrode;
providing a second substrate on the first liquid crystal layer;
forming a second liquid crystal layer having a helical alignment on the second substrate to reflect circularly polarized light at a direction different from that in the first liquid crystal layer;
providing a third substrate on the second liquid crystal layer; and
forming a second common electrode and a second data electrode on one of the second and third substrates to control the second liquid crystal layer.

16. The method according to claim 15, wherein the light-absorbing layer is formed between the lower substrate and the common electrode.

17. The method according to claim 15, further comprising forming first and second alignment layers on opposing surfaces of the first and second substrates, respectively.

18. The method according to claim 15, further comprising forming third and fourth alignment layers on opposing surfaces of the second and third substrates, respectively.

19. The method according to claim 15, further comprising providing a fourth substrate between the first liquid crystal layer and the second substrate.

20. The method according to claim 19, further comprising providing a phase difference plate between the fourth substrate and the second substrate.

21. The method according to claim 15, wherein the first and second liquid crystal layers include cholesteric liquid crystal layers.

22. The method according to claim 15, wherein the first and second liquid crystal layers include ferroelectric liquid crystal layers.

23. A method of fabricating a liquid crystal display device, comprising:
forming a light-absorbing layer on a lower substrate;
forming a gate line, a gate electrode, a common line, and a common electrode on the lower substrate;
forming a gate insulating layer along an entire surface of the lower substrate;
forming a thin film transistor on the lower substrate including a semiconductor layer on the gate insulating layer above the gate electrode, source and drain electrodes above both sides of the semiconductor layer, and the gate electrode;
forming a data line and a data electrode on the gate insulating layer perpendicular to the gate line;
forming a passivation layer on the lower substrate including the data electrode;
forming a first alignment layer on the passivation layer;
forming a black matrix layer on an upper substrate to prevent light leakage on the data line, the gate line, and the thin film transistor;
forming a second alignment layer on the upper substrate including the black matrix layer;
forming a first liquid crystal layer having a first helical alignment between the upper and lower substrates;
forming a middle substrate between the upper and lower substrates; and
forming a second liquid crystal layer having a second helical alignment different from the first helical alignment between the middle substrate and one of the upper and lower substrates.

24. The method according to claim 23, wherein the upper and lower substrates are formed of a transparent material.

25. The method according to claim 23, wherein the light-absorbing layer is formed between the lower substrate and the common electrode.

26. The method according to claim 23, wherein a voltage applied to the common electrode and the data electrode is proportional to a helical pitch of at least one of the first and second liquid crystal layers.

27. The method according to claim 23, wherein the first and second alignment layers are not rubbed, or have weak anchoring energy.

28. The method according to claim 23, wherein a helical axis of at least one of the first and second liquid crystal layers is perpendicular to the upper and lower substrates.

* * * * *